(12) United States Patent
Bengough et al.

(10) Patent No.: US 11,310,158 B2
(45) Date of Patent: Apr. 19, 2022

(54) PACKET CLASSIFICATION USING FINGERPRINT HASH TABLE

(71) Applicant: CORSA TECHNOLOGY INC., Ottawa (CA)

(72) Inventors: Peter Bengough, Kanata (CA); Stacey Sheldon, Ottawa (CA); Jonathan Sewter, Kanata (CA)

(73) Assignee: CORSA TECHNOLOGY INC.

( * ) Notice: Subject to any disclaimer, the term of this patent is extended or adjusted under 35 U.S.C. 154(b) by 338 days.

(21) Appl. No.: 15/835,761

(22) Filed: Dec. 8, 2017

(65) Prior Publication Data
US 2019/0182160 A1 Jun. 13, 2019

(51) Int. Cl.
H04L 12/743 (2013.01)
H04L 12/721 (2013.01)
H04L 12/741 (2013.01)
H04L 12/851 (2013.01)
H04L 1/00 (2006.01)
H04L 45/7453 (2022.01)
H04L 45/00 (2022.01)
H04L 45/745 (2022.01)
H04L 47/2441 (2022.01)

(52) U.S. Cl.
CPC .......... *H04L 45/7453* (2013.01); *H04L 45/38* (2013.01); *H04L 45/54* (2013.01); *H04L 45/7457* (2013.01); *H04L 47/2441* (2013.01); *H04L 1/004* (2013.01)

(58) Field of Classification Search
None
See application file for complete search history.

(56) References Cited

U.S. PATENT DOCUMENTS 6,928,054 B1 * 8/2005 Montuno ............... H04L 29/06 370/235
7,827,218 B1 * 11/2010 Mittal ................. G06F 16/2264 707/899

(Continued)

OTHER PUBLICATIONS

Adam Kirsch et al., "More Robust Hashing: Cuckoo Hashing with a Stash", SIAM Journal on Computing, vol. 39 Issue 4, Society for Industrial and Applied Mathematics Philadelphia, PA, USA, Sep. 2009, 25 Pages 1543-1561.

(Continued)

*Primary Examiner* — Jeffrey M Rutkowski
*Assistant Examiner* — Ning Li
(74) *Attorney, Agent, or Firm* — Barnes & Thornburg LLP

(57) ABSTRACT

A key is descriptive of a data packet, and a fingerprint hash function is applied to such a key to generate a fixed length fingerprint of the key. An index value is determined based on a portion of the fingerprint. A hash table could be populated by storing in a memory, at a memory location associated with the index value: a remainder of the fingerprint other than the portion of the fingerprint that was used to determine the index value, to indicate that data packets consistent with the key are to be handled in accordance with packet handling metadata. During packet processing, if a memory location associated with an index value stores a remainder of the fingerprint other than the portion of the fingerprint that was used to determine the index value, a data packet is handled according to packet handling metadata associated with the fingerprint.

14 Claims, 9 Drawing Sheets

(56) References Cited

U.S. PATENT DOCUMENTS

| | | | | |
|---|---|---|---|---|
| 8,655,878 B1* | 2/2014 | Kulkarni | | G06F 16/43 |
| | | | | 707/736 |
| 9,509,809 B2 | 11/2016 | Laufer et al. | | |
| 10,355,994 B1* | 7/2019 | Matthews | | H04L 45/7453 |
| 2003/0210689 A1* | 11/2003 | Davis | | H04L 45/745 |
| | | | | 370/389 |
| 2013/0018932 A1* | 1/2013 | Bhaskar | | H03M 7/3088 |
| | | | | 708/203 |
| 2013/0114414 A1* | 5/2013 | Song | | H04L 47/34 |
| | | | | 370/237 |
| 2014/0195545 A1* | 7/2014 | Anand | | H04L 45/7453 |
| | | | | 707/747 |
| 2014/0223030 A1* | 8/2014 | Bhaskar | | H03M 7/3088 |
| | | | | 709/247 |
| 2014/0307737 A1* | 10/2014 | Levy | | G06F 16/245 |
| | | | | 370/392 |
| 2015/0058526 A1* | 2/2015 | Venkata | | G06F 3/0659 |
| | | | | 711/103 |
| 2015/0334125 A1* | 11/2015 | Bartos | | G06F 21/552 |
| | | | | 726/24 |
| 2015/0341473 A1* | 11/2015 | Dumitrescu | | H04L 69/22 |
| | | | | 370/392 |
| 2015/0370495 A1* | 12/2015 | Georgiev | | G06F 3/0641 |
| | | | | 711/114 |
| 2016/0041856 A1* | 2/2016 | Sankaralingam | | G06F 15/7821 |
| | | | | 719/330 |
| 2016/0112319 A1* | 4/2016 | Hasani | | H04L 45/748 |
| | | | | 370/392 |
| 2016/0306923 A1* | 10/2016 | van Rooyen | | G06F 12/0877 |
| 2016/0357743 A1* | 12/2016 | Swaminathan | | G06F 16/2255 |
| 2017/0244999 A1* | 8/2017 | Chen | | H04N 21/4345 |
| 2018/0041470 A1* | 2/2018 | Schultz | | H04L 47/24 |
| 2018/0083866 A1* | 3/2018 | Gobriel | | H04L 45/02 |
| 2018/0192101 A1* | 7/2018 | Bilobrov | | G06F 16/907 |
| 2018/0205653 A1* | 7/2018 | Wang | | H04L 61/10 |
| 2018/0212889 A1* | 7/2018 | Xu | | H04L 47/2441 |
| 2018/0246649 A1* | 8/2018 | Datar | | G06F 3/0608 |
| 2018/0341596 A1* | 11/2018 | Teotia | | G06F 12/1018 |

OTHER PUBLICATIONS

Dong Zhou et al., "Scalable, High Performance Ethernet Forwarding with CuckooSwitch", CoNEXT'13, Dec. 9-12, 2013, Santa Barbara, CA, USA, 12 pages.

Bin Fan et al., "Cuckoo Filter: Practically Better Than Bloom", CoNEXT'14, Dec. 2-5, 2014, Sydney, Australia, 13 pages.

* cited by examiner

PACKET CLASSIFICATION USING FINGERPRINT HASH TABLE

TECHNICAL FIELD

The embodiments herein generally relate to the field of communications networks and more specifically to classification of data packets to determine their handling by communications networks.

DESCRIPTION OF THE RELATED ART

Data traffic is composed of data packets. Data packets can be organized according to various standard data protocols such as the Transmission Control Protocol (TCP) or the File Transfer Protocol (FTP), for example. A data packet is typically organized into a header and a payload. The header contains different fields storing information about the packet. Examples of header fields include: source address, destination addresses, protocol type, destination port addresses, and packet length. The payload is the actual data to be transferred. As a data packet is passed through a communication network from source to destination it is typically handled multiple times by intermediate nodes in the communication network until it reaches its final destination. Intermediate nodes could include, for example, routers, switches or firewalls. Intermediate nodes could classify the packet based on its header information or the payload itself. The classification of the packet could then determine how the packet is handled.

SUMMARY

According to an aspect of the present disclosure, a method involves determining a key that is descriptive of a data packet and packet handling metadata associated with handling of a data packet that is consistent with the determined key. Such a method could also involve applying a fingerprint hash function to the determined key to generate a fixed length fingerprint of the determined key; determining an index value based on a portion of the fingerprint; and storing in a memory, at a memory location associated with the index value: a remainder of the fingerprint other than the portion of the fingerprint, to indicate that data packets consistent with the determined key are to be handled in accordance with the determined packet handling metadata.

According to another aspect, a method involves: determining a key based on a data packet; applying a fingerprint hash function to the determined key to generate a fingerprint of the determined key; determining an index value based on a portion of the fingerprint; accessing a memory location associated with the index value to determine whether the memory location stores a remainder of the fingerprint other than the portion of the fingerprint; and handling the data packet according to packet handling metadata associated with the fingerprint, where the memory location stores the remainder of the fingerprint.

An apparatus according to a further aspect includes a memory and a processor. The processor is coupled to the memory, to: determine, a key that is descriptive of a data packet and packet handling metadata associated with handling of a data packet that is consistent with the determined key; apply a fingerprint hash function to the determined key to generate a fixed length fingerprint of the determined key; determine an index value based on a portion of the fingerprint; and store in the memory, at a memory location associated with the index value: a remainder of the fingerprint other than the portion of the fingerprint to indicate that data packets consistent with the determined key are to be handled in accordance with the determined packet handling metadata.

In another apparatus that includes a memory and a processor, the processor is coupled to the memory, to: determine a key based on a data packet; apply a fingerprint hash function to the determined key to generate a fingerprint of the determined key; determine an index value based on a portion of the fingerprint; access in the memory a memory location associated with the index value to determine whether the memory location stores a remainder of the fingerprint other than the portion of the fingerprint; and handle the data packet according to packet handling metadata associated with the fingerprint, where the memory location stores the remainder of the fingerprint.

A non-transitory computer-readable medium storing a data structure is also disclosed. The data structure includes memory locations associated with respective index values. Each index value is based on a portion of a fingerprint generated by applying a fingerprint hash function to a key that is descriptive of a data packet. The data structure also includes, at each memory location: a remainder of the fingerprint, other than the portion of the fingerprint upon which the index value associated with the memory location is based.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1A:
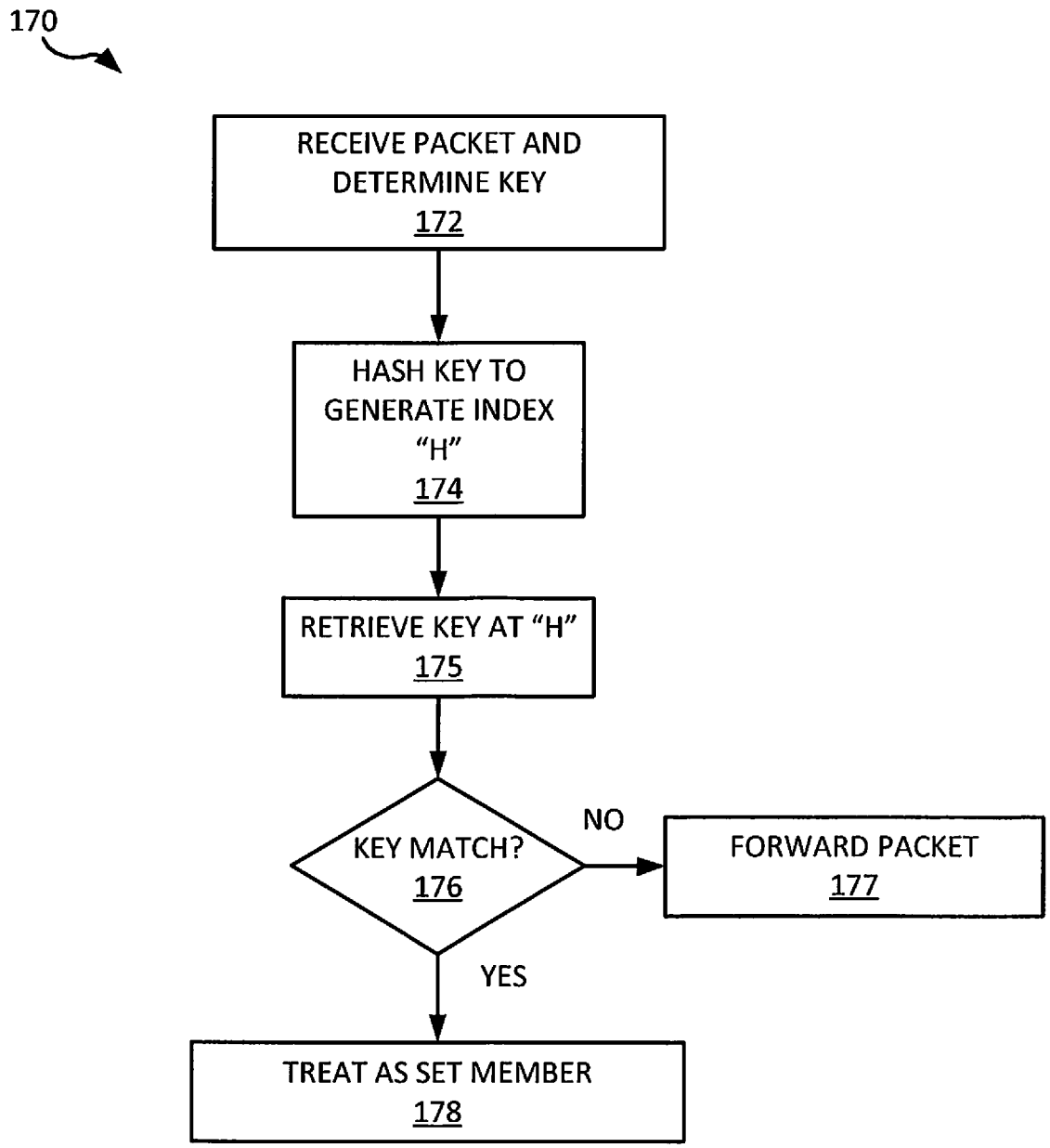
FIG. 1A is a flow diagram of an example packet classification method using a hash table.

Packet classification determines how a particular data packet is handled by the communications network. Packets could be classified based on their header information, for example their source address, destination address or protocol type. Packets could also or instead be classified according to other contextual information such as, for example the packet's frame length, the ingress network interface (e.g. 10G Physical Port 3 or VLAN sub-interface 145 on Physical Port 7), the time of day they arrived or an externally tracked flow state (e.g. the flow has been allowed by a firewall, the packet is related to a flow allowed by a firewall, a synchronize request has been received for this flow). The particular information used to classify a packet is sometimes referred to as a "key". A key might comprise, for example, any one or more of the packet's Internet Protocol (IP) source address, its IP destination address, its protocol type, its source port address, its destination port address, and/or other header information for header-based packet classification. A combination of "M" packet header fields is sometimes referred to as an "M-tuple".

A packet classification method could make use of a data structure to classify a packet. The data structure could store one or more keys and each key's associated packet handling metadata. Packet handling metadata could, for example, indicate that the packet is to: be dropped, receive expedited handling (for example bypassing a firewall), or receive best effort handling. When a packet is received its key could be determined and the data structure could then be searched for a matching key. If a matching key is found in the data structure then the packet could be handled according to the matching key's associated packet handling metadata.

The packet handling metadata could directly indicate how the packet is to be handled or could indirectly indicate how the packet is to be handled by pointing to a location storing explicit packet handling instructions in an additional packet handling memory.

If a match is not found in the data structure then the packet could be passed to a next stage of packet processing.

In some cases the data structure could explicitly store only the key and the packet handling metadata could be stored implicitly as the presence or absence of the key in the data structure. For example, the data structure could store a blacklist of malicious sites. The presence of a packet's key in the data structure would indicate that the packet originated from a blacklisted site while the key's absence would indicate that the packet did not originate from a blacklisted site.

Packet classification could be considered a way of determining set membership of a packet. Packet classification could use a variety of sets. For example, there could be a set of packets that are to be expedited, a set of packets that are to be dropped, a set of packets that have a high reputation score, and a set of packets that have a low reputation score. Reputation score is a measure of the likelihood that a packet is from a legitimate source rather than a malicious source.

To properly classify a packet a data structure should be large enough to store all the possible keys of all the different sets. This could become unworkable if there are many sets, for sets with many keys as members, and/or for sets with very long keys.

For example, a distributed denial of service attack can involve millions of malicious hosts. If a packet's Internet Protocol (IP) source address were used as the packet classification key then a data structure for the set of all malicious host could have millions of entries, with each entry comprising either a 32 bit Internet Protocol version 4 (IPv4) or a 128 bit Internet Protocol version 6 (IPv6) source address and the associated packet handling metadata.

A key could also comprise more than a single packet field and therefore be quite long. For example, a commonly used key to describe a packet "flow" comprises the packet's 128 bit IPv6 source address, its 128 bit IPv6 destination address, its 16 bit port source address, its 16 bit port destination address and its 8 bit IP protocol type. Such a key would therefore be at least 296 bits long. If there were one million different keys in the different sets then the data structure would need at least 296 Mb of storage to store only its keys. The time required to search such a large data structure for a key match to classify a packet might undesirably compromise transmission speed of a network.

Hashing is a method that could be used to reduce the size of a data item and make its handling easier. Hashing is a mathematical operation that converts a large number or data item to a much shorter number (a "hash"). A data structure which stores keys using their hash values as an index is called a hash table. A hash table comprises multiple "buckets". Each bucket is associated with a unique hash value or index. If the hash value is "N" bits long then the hash table can have a maximum of $2^N$ buckets. A bucket comprises one or more "slots" for the storage of a key. Each slot can hold a single key. A hash table's buckets could comprise a single slot or multiple slots.

To classify a packet using a hash table the packet's key is hashed to generate a hash value. The key(s) stored in the slot(s) of the bucket at that hash value in the hash table are then retrieved and compared to the packet's key. If there is a match then the packet is treated as a set member and could be handled according to the associated packet handling metadata stored with the matching key. If no match is found then the packet could be forwarded to a next stage of processing.

FIG. 1A is a flow diagram of an example packet classification method 170 using a hash table. At 172 a packet is received and its key is determined. At 174 the key is hashed to a hash value "H". At 175 the value stored in the hash table at index H is retrieved. At 176 the retrieved value is compared to the packet's key. If the packet's key and the retrieved key match (YES at 176) then the packet is treated as a set member, as shown at 178. If the packet's key and the retrieved key do not match (NO at 176) then the packet is forwarded to the next stage of processing, as shown at 177.

The outcome of the above described classification process is deterministic. It can be determined with certainty whether or not the packet's key is in the hash table and thus how the packet should be handled. The memory requirements of the hash table depend, however, on the length of the key and for very long keys the memory requirement could be sizeable. In the method of FIG. 1A, key hashing is used to reduce the length of the data structure's index, but the data structure still stores the key.

Figure 1B:
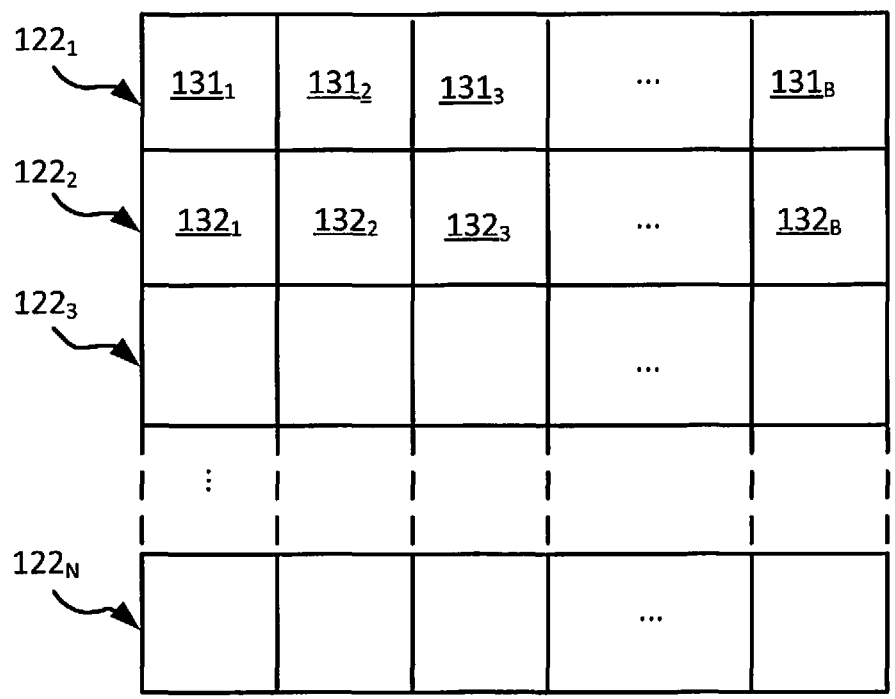
FIG. 1B is a block diagram of an example "fingerprint hash table".

FIG. 1B is a block diagram of an example "fingerprint hash table". Fingerprint hash table 120 comprises "N" buckets $122_1$, $122_2$, $122_3$ ... $122_N$. Each bucket is divided into "B" slots, some of which are labeled by way of example in FIG. 1B. As shown, bucket $122_1$ comprises slots $131_1$, $131_2$, $131_3$ ... $131_{13}$ and bucket $122_2$ comprises slots $132_1$, $132_2$, $132_3$ ... $132_{13}$. The other buckets $122_3$ ... $122_N$ also include slots.

Each slot in buckets $122_1$, $122_2$, $122_3$ ... $122_N$ can store a "fingerprint" (F) of a key and the key's associated packet handling metadata (A). A key's fingerprint is generated by hashing the key using a fingerprint hash function. A fingerprint hash function is a mathematical algorithm that maps a large number or data item to a shorter number of a fixed bit length, irrespective of the length of the original number or data item. A fingerprint hash function also attempts to generate a unique fingerprint for each unique number or data item, however this is not guaranteed in all circumstances. There is generally a finite probability that two different keys could be hashed to the same fingerprint value. This is sometimes referred to as a "collision". The probability of a collision decreases with the bit length of the fingerprint and for some hash functions decreases exponentially with bit length. The probability of a collision could therefore be made arbitrarily small by choosing an appropriate fingerprint bit length.

FIG. 1B is an example and a fingerprint hash table could be configured to have buckets with a single slot or multiple slots. In one embodiment each hash table bucket has eight slots. The number of slots could be variable and/or dynamically allocated in some embodiments. Although embodiments that are implemented using components that execute software might be more easily adapted to variable/dynamic slot allocation, the number of slots and slot allocation could be variable and/or dynamic even in hardware-based implementations.

Unlike the regular hash table described previously, fingerprint hash table 120 does not store keys, but instead stores each key's fingerprint and associated packet handling metadata. Therefore, again unlike a regular hash table, the memory requirement for fingerprint hash table 120 does not depend on key length, but rather on the length of the fingerprint and associated packet handling metadata.

An important property of fingerprint hash table 120 is that it can accommodate a set whose member keys are of different lengths. For example, many communication networks support data packets using both the Internet Protocol version 4 (IPv4) and the Internet Protocol version 6 (IPv6). As stated previously, the IPv6 5-tuple is at least 296 bits long. An IPv4 5-tuple could however, only be 104 bits long since the IPv4 source and destination addresses are only 32 bits. However, an IPv6 5-tuple key and an IPv4 5-tuple key would both be hashed to fingerprints of the same length and could both be stored in the same fingerprint hash table.

Another difference between fingerprint hash table 120 and a regular hash table is that packet classification using fingerprint hash table 120 might not be deterministic. As described above, there is generally a finite probability that two different keys could be hashed to the same fingerprint value, creating a collision. If the fingerprint of a packet's key matches an entry in a fingerprint hash table there is a finite probability that this is a false positive and that the packet is not a set member. If, however, the fingerprint of a packet's key does not match to an entry in a fingerprint hash table then it is certain that the packet is not a set member.

The probability of a false positive can be managed by appropriate choice of the fingerprint hash function and the fingerprint length. The probability of a false positive generally decreases exponentially with fingerprint length. An acceptable false positive rate depends on the specific application and a significant number of bits, for example 64$b$, might be desirable for some applications, such as blacklist filtering.

A potential benefit of employing a significant number of fingerprint bits is that some of the fingerprint's bits could be used as the fingerprint's own bucket index. Fingerprint hash table 120 might therefore explicitly store only a portion of a fingerprint and its associated packet handling metadata. For example, referring to FIG. 1B, one of slots 131$_1$, 131$_2$, 131$_3$ . . . 131$_B$ of bucket 122$_1$ might not store an entire fingerprint but instead store only a portion of the bits of the fingerprint (F*). The remaining bits of the fingerprint could be stored implicitly as the index of bucket 122$_1$. The bucket index could therefore comprise selected bits of the fingerprint and the explicitly stored portion of the key's fingerprint could comprise the unselected bits (those that are not part of the index).

For example, in a fingerprint hash table with 8M ($2^{23}$) buckets that each store a fingerprint of length 60$b$, the bucket index could be the 23 highest order bits of the fingerprint and the explicitly stored portion could be the remaining 37 lowest order bits. Alternatively the bucket index could be the 23 lowest order bits and the explicitly stored portion of the key's fingerprint could be the 37 highest order bits. Alternatively the bucket index could comprise 23 non-sequential fingerprint bits. Different numbers of bits could be explicitly and implicitly stored in other embodiments.

The memory requirements of the fingerprint hash table are reduced, relative to storing complete fingerprints, by explicitly storing only a portion of the fingerprint and associated packet handling metadata.

Explicit storage of only a portion F* of a fingerprint is one way to reduce storage requirements for a fingerprint hash table.

Packet handling metadata could also or instead be stored implicitly as the presence or absence of the fingerprint in the fingerprint hash table. For example, the fingerprint hash table could store a blacklist of malicious sites. The presence of a packet's fingerprint in the fingerprint hash table would indicate that the packet originated from a blacklisted site while the fingerprint's absence would indicate that the packet did not originate from a blacklisted site.

Figure 1C:
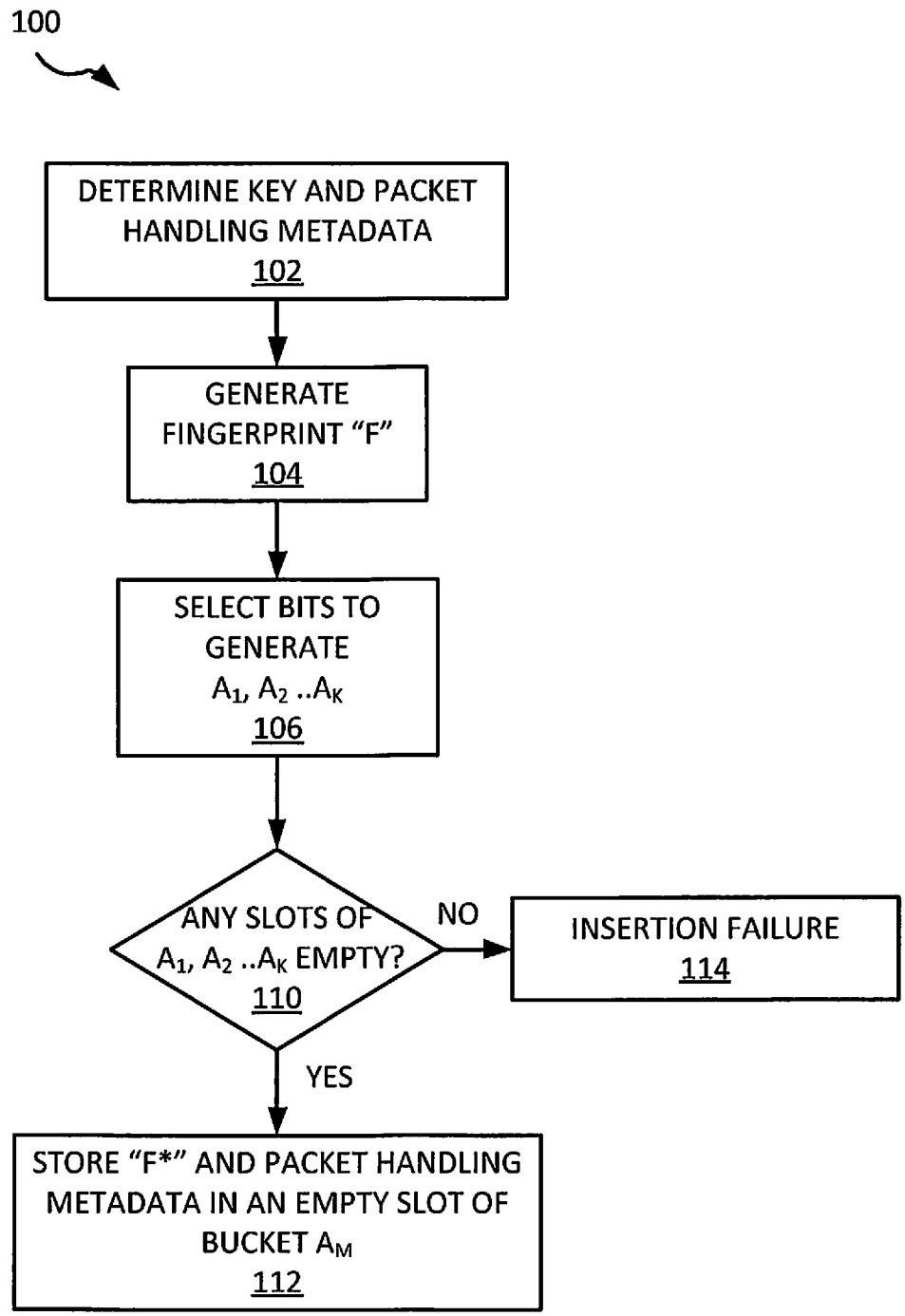
FIG. 1C is flow diagram showing an example method of filling a fingerprint hash table.

FIG. 1C is a flow diagram showing an example method of filling a fingerprint hash table. Method 100 could be used to fill a hash table such as hash table 120 of FIG. 1B.

At 102 a key that is descriptive of a data packet and packet handling metadata associated with handling of the data packet are determined. A key could be determined from a received packet or group of packets by, for example, examining the packet's header fields and concatenating selected header fields to create the key. A key might also or instead be determined proactively, by anticipating the values of the header fields of a yet to be received data packet and concatenating selected header fields to create the key.

The packet's packet handling metadata could be created in any of a variety of ways. It could be automatically determined by a network security device such as a firewall or it might be manually determined by a network administrator, for example.

At 104 a "fingerprint" ("F") of the key is generated using a fingerprint hash function.

In one embodiment the generated fingerprint is 60 bits long. There exist a variety of hash functions suitable to generate a fixed length fingerprint including for example, the Cyclical Redundancy Check (CRC) hash function, the CityHash hash function, the Spookyhash hash function, the FarmHash hash function or the Jenkins hash function. At 106, "k" different index values $A_1, A_2 \ldots A_k$ are created based on portions or parts of the fingerprint, illustratively by selecting bits of the fingerprint. For example, a 128 bit long fingerprint could be divided into four different index values $A_1, A_2, A_3, A_4$ of 32 bits each, wherein $A_4$ comprises the highest 32 bits of F, $A_3$ comprises the next lower 32 bits of F, $A_2$ comprises the next lower 32 bits and $A_1$ comprises the lowest 32 bits of F. Index values $A_1, A_2 \ldots A_k$ could be of different lengths or could all be of the same length. Index values could be created from non-overlapping portions of the fingerprint and/or from overlapping portions of the fingerprint. For example, a 128 bit long fingerprint could be divided into four different index values $A_1, A_2, A_3, A_4$ of 48 bits each, wherein $A_4$ comprises the portion of F from the $128^{th}$ (highest) bit to the $81^{st}$ bit, $A_3$ comprises the fingerprint portion from the $96^{th}$ to the $49^{th}$ bit, $A_2$ comprises the fingerprint portion from the $64^{th}$ bit to the $17^{th}$ bit and $A_1$ comprises the portion of F from the $48^{th}$ bit to the first (lowest) bit.

Any portion of a fingerprint upon which an index value is based does not include the entire fingerprint. All portions could together cover the entire fingerprint, but no single portion includes the entire fingerprint.

In one embodiment k=2 and the index values $A_1$, $A_2$ are of equal bit length.

Although FIG. 1C, and other drawings herein, illustrate k index values being created, each index value could instead be created as needed. Some embodiments could search multiple indexed buckets in parallel, in which case multiple index values could be created. In sequential search embodiments, each index value could instead be created when it is needed, for example when a bucket corresponding to a previous index value is occupied and a memory location corresponding to another index value is to be searched.

At 110 it is determined whether any of buckets at $A_1$, $A_2 \ldots A_k$ have an empty slot. To make this determination the contents of the buckets at $A_1$, $A_2 \ldots A_k$ could be read sequentially until an empty slot is found. Alternatively, the contents of the buckets at $A_1$, $A_2 \ldots A_k$ could all be read and evaluated in parallel. A slot stores a single fingerprint and its associated packet handling metadata in an embodiment. A slot could be considered to be empty and available for storing a key if it is not storing a fingerprint and its associated packet handling metadata. A slot could be considered to be full and unavailable for storing a key if it is storing a fingerprint and its associated packet handling metadata.

A slot could be determined to be empty by, for example, pre-loading every slot in every bucket with a known value. For example, every slot in every bucket could be initialized to zero prior to beginning to fill the fingerprint hash table. If a slot was storing the known value this would indicate that the slot was empty. If the slot was not storing the known value this would indicate that the slot was already in use to store a fingerprint.

Slot availability could be determined in other ways, based on a flag or other indicator(s) as to whether a slot can or cannot be written to and/or overwritten, for example.

If there is a bucket with an empty slot (YES at 110), associated with one ($A_M$) of the index values $A_1$, $A_2 \ldots A_k$ then at 112, in the empty slot of that bucket, the remaining bits "F*" of fingerprint "F" not selected as index bits of that bucket and the fingerprint's associated packet handling metadata are explicitly stored.

If none of the buckets in the fingerprint hash table at $A_1$, $A_2 \ldots A_k$ have empty slots (NO at 110) then an insertion failure is recorded at 114. Various failure or error handling actions could be performed in the event of an insertion failure. For example, fingerprint "F" and its associated packet handling metadata might not be added to the fingerprint hash table or the least recently used entry or the least used entry from any of buckets at $A_1$, $A_2 \ldots A_k$ might be evicted and replaced with fingerprint F and its associated metadata.

Method 100 could have a deterministic and constant fingerprint insertion time compared to other methods of constructing a hash table.

Other variations of method 100 are possible.

For example, there could be "m" different fingerprint hash tables $T_1 \ldots T_m$. Each fingerprint hash table $T_1 \ldots T_m$ could be indexed by different and mutually exclusive subsets of indices $A_1$, $A_2 \ldots A_k$. For example, Table $T_1$ could be indexed by index values $A_1 \ldots A_a$, table $T_2$ could be indexed by indices $A_{a+1} \ldots A_b$ and so on.

Indices $A_1$, $A_2 \ldots A_k$ might not all be of the same length. For example, indices $A_1 \ldots A_a$ could have a different bit length than index values $A_{a+1} \ldots A_b$ and there could be a first fingerprint hash table indexed by index values $A_1 \ldots A_a$ and a second fingerprint hash table indexed by hash value $A_{a+1} \ldots A_b$.

Some embodiments could involve checking for a duplicate or colliding entry before storing F* and packet handling metadata at 112. For example, the empty slot search at 110 could involve checking occupied slots at $A_1$, $A_2 \ldots A_k$ for F* and, in some embodiments, the determined packet handling metadata. If a matching F* entry is found in an occupied slot at any of $A_1$, $A_2 \ldots A_k$ any of a variety of actions could be taken including: not storing F* and its associated packet handling metadata again at 112, storing any new associated packet handling metadata at 112, incrementing a reference counter which records the number attempts to insert a fingerprint at the index $A_1$, $A_2 \ldots A_k$, and/or incrementing a global collision counter which records the total number of collisions for the fingerprint hash table.

Figure 1D:
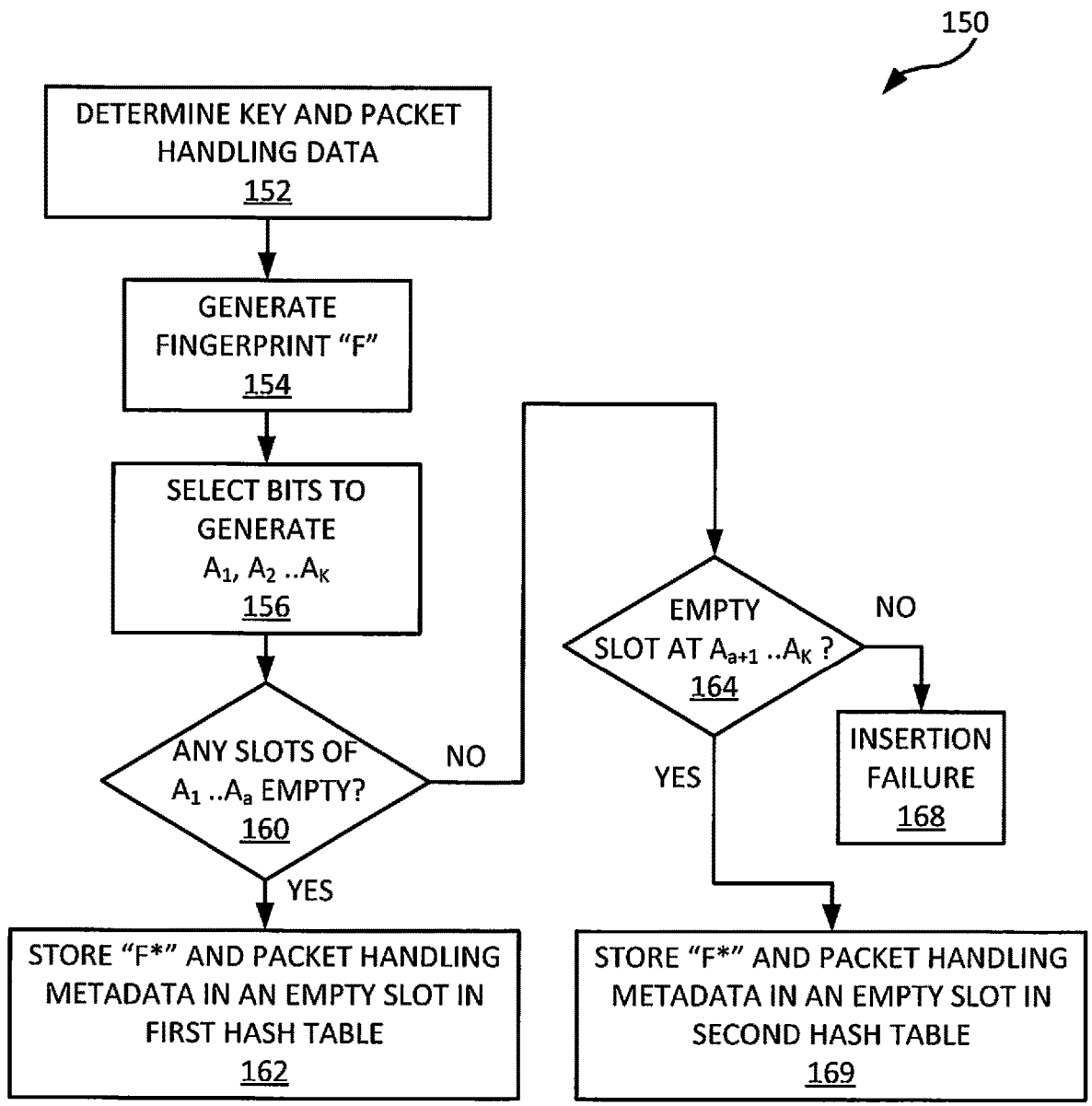
FIG. 1D is flow diagram showing an example method of filling two fingerprint hash tables.

FIG. 1D is flow diagram showing an example method 150 of filling two fingerprint hash tables.

At 152 a key descriptive of a data packet and packet handling metadata associated with handling of the data packet are determined. As described above, a packet key could be determined from a received packet or group of packets by, for example, examining the packet's header fields and concatenating selected header fields to create the key. A packet key might also or instead be determined proactively by anticipating the values of the header fields of yet to be received data packets and concatenating selected header fields to create the key.

The packet's packet handling metadata could be created in any of a variety of ways, examples of which are provided elsewhere herein.

At 154 a "fingerprint" of the key ("F") is generated using a fingerprint hash function.

At 156, "k" different index values $A_1$, $A_2 \ldots A_k$ are created based on portions of the fingerprint, illustratively by selecting bits of the fingerprint. In an embodiment, the bit lengths of index values $A_{a+1} \ldots A_k$ are equal and the bit lengths of index values $A_1 \ldots A_a$ are also equal.

At 160 it is determined whether any of the buckets at $A_1 \ldots A_a$ in a first fingerprint hash table have an empty slot.

If there is a bucket at $A_1 \ldots A_a$ in the first fingerprint hash table with an empty slot (YES at 160) then at 162, in the empty slot of that bucket, the remaining bits F* of fingerprint "F" not selected as index bits of that bucket and the fingerprint's associated packet handling metadata are explicitly stored.

If none of the buckets at $A_1 \ldots A_a$ in the first fingerprint hash table have empty slots (NO at 160) then at 164 it is determined whether the buckets at $A_{a+1} \ldots A_k$ in a second fingerprint hash table have an empty slot. If there is a bucket at $A_{a+1} \ldots A_k$ in the second fingerprint hash table with an empty slot (YES at 164) then at 169, in the empty slot of that bucket, the remaining bits F* of fingerprint "F" not selected as index bits of that bucket and the fingerprint's associated packet handling metadata are explicitly stored.

If none of the buckets at $A_{a+1} \ldots A_k$ in the second fingerprint hash table have an empty slot (NO at 164) then an insertion failure is recorded at 168. Various failure or error handling actions could be performed in the event of an insertion failure as described previously.

In method 150 the second fingerprint hash table indexed by $A_{a+1} \ldots A_k$ acts as an overflow buffer to increase the potential utilization of the first fingerprint hash table and accommodate insertion failures in the first fingerprint hash table. Without the second hash table, the first hash table would have to be much larger (more slots) to maintain the same insertion failure rate as the two-table solution represented in FIG. 1D. The larger table would have a lower utilization since it is larger, but would be storing approximately the same number of fingerprints as the first and second tables.

In one embodiment of method 150 there is a first fingerprint hash table indexed by a first index and a second fingerprint hash table indexed by a second index, the first index is 23 bits long, and the second index is 9 bits long. If the fingerprint and associated packet handling metadata have a total length of 87 bits, then the first fingerprint hash table explicitly stores a 64 bit value (87-23) and the second hash table explicitly stores a 78 bit value (87-9).

The first and second fingerprint hash tables of method 150 could be stored in two different memories. The memories could be two physically distinct memory devices. For example, in one embodiment classification of received packets using the fingerprint hash tables is performed by an integrated circuit such as a microprocessor, digital signal processor or a Field Programmable Gate Array (FPGA), the second hash table is stored in the integrated circuit's "on-chip" memory and the first hash table is stored in an "off-chip" memory, such as, for example a dedicated memory integrated circuit such as a Dynamic Random Access Memory (DRAM), or a Static Random Access Memory (SRAM) or a flash memory.

The hash tables could instead be stored on the same memory device but in physically different locations. For example, the hash tables could be stored in a Dynamic Random Access Memory (DRAM). The DRAM could be divided into multiple banks and the hash tables could be assigned to different banks.

In an embodiment, the second hash table could also be replaced by a Content Addressable Memory (CAM), and the fingerprint stored in the CAM at 169.

Variations of method 150 are possible. For example, there could be more than two fingerprint hash tables, such as one fingerprint hash table indexed by hash value $A_1 \ldots A_a$ a second hash table indexed by index values $A_{a+1} \ldots A_b$ and a third hash table indexed by the remaining index values $A_{b+1} \ldots A_K$.

In the above examples, the index values for different fingerprint hash tables are of different lengths. In other embodiments, two or more different fingerprint hash tables could be indexed using index values of the same length.

As noted above for the method illustrated in FIG. 1C, other types of failure or error handling than recording a failure could also or instead be performed in the event of an insertion failure as described previously.

Duplicate or colliding entry checking, as also referenced above in the description of FIG. 1C, could also or instead be implemented in another embodiment of the method illustrated in FIG. 1D, before the storing at either or both of 162, 169.

Figure 2A:
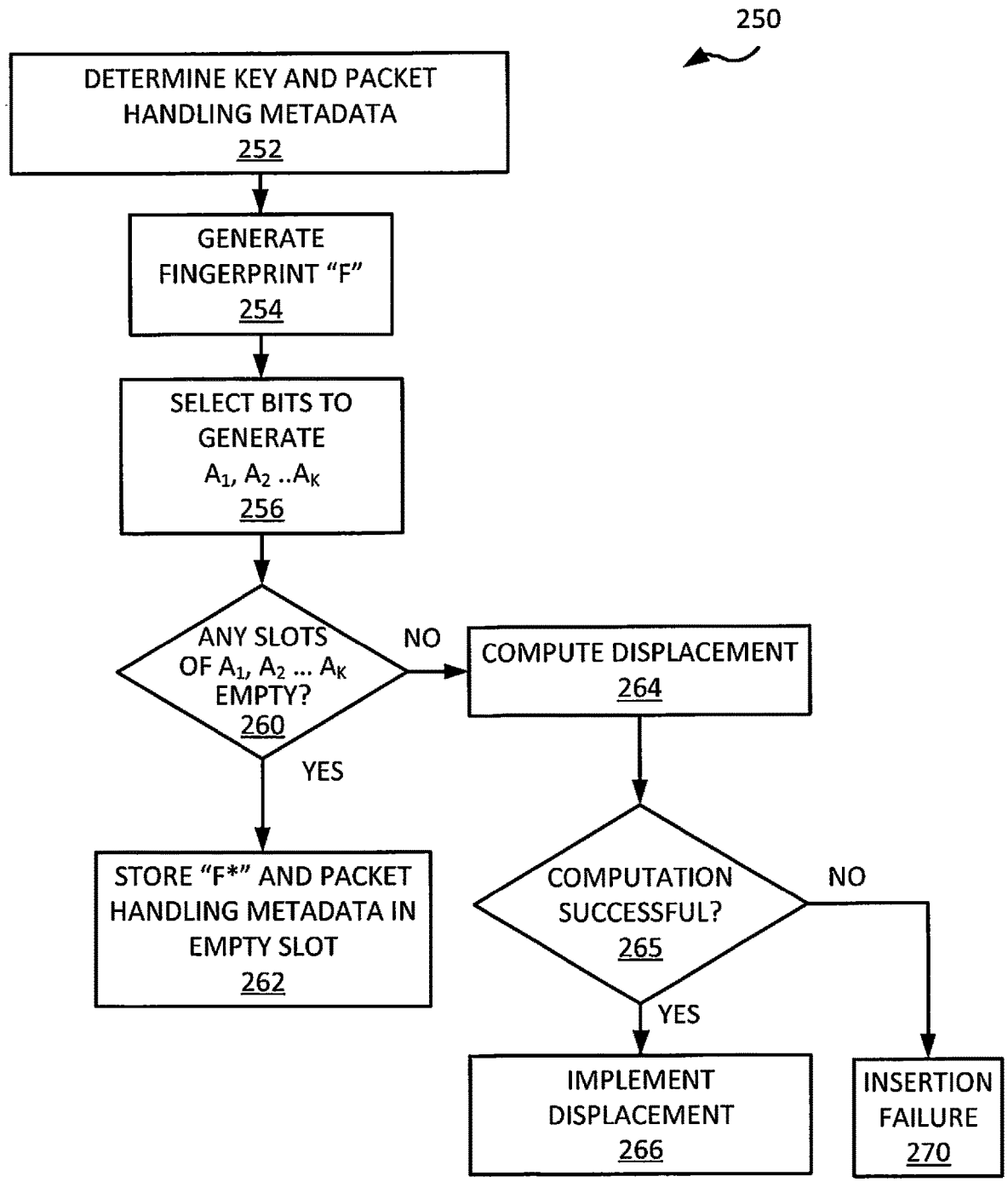
FIG. 2A is flow diagram showing another example method of filling a fingerprint hash table.

FIG. 2A is flow diagram showing another example method of filling a fingerprint hash table.

In the method 250, at 252 a key descriptive of a data packet and packet handling metadata associated with handling of the data packet are determined. As described above, a packet key could be determined from a received packet or group of packets by, for example, examining the packet's header fields and concatenating selected header fields to create the key, and a packet key might also or instead be determined proactively by anticipating the values of the header fields of a yet to be received data packet and concatenating selected header fields to create the key.

Examples of how the packet handling metadata could be generated are described elsewhere herein.

At 254 a "fingerprint" (F) of the key is generated using a fingerprint hash function. In one embodiment the fingerprint is 87 bits in length. A fingerprint hash could be generated by any of the techniques described herein.

At 256 "k" different index values $A_1, A_2 \ldots A_k$ are created based on portions of the fingerprint, illustratively by selecting bits of fingerprint F.

At 260 it is determined whether any of the buckets at $A_1, A_2 \ldots A_k$ have an empty slot. A bucket could have a single storage slot or multiple slots. In one embodiment, all hash table buckets have the same number of slots. In one embodiment each hash table bucket has eight slots.

If there is a bucket with an empty slot (YES at 260) then at 262 in the empty slot of that bucket the remaining bits F* of fingerprint "F" not selected as index bits of that bucket and the fingerprint's associated packet handling metadata are explicitly stored.

A slot could be determined to be empty or full by any of the techniques described herein.

If none of the buckets at $A_1, A_2 \ldots A_k$ have empty slots (NO at 260) then at 264 a displacement of the fingerprint hash table's stored fingerprints and metadata which would create an empty slot to store F* and packet handling metadata for fingerprint F is computed. If the computation is unsuccessful and no displacement can be found to create an empty slot to store F* and packet handling metadata for fingerprint F (NO at 265) then an insertion failure is recorded at 270. Other failure or error handling could also or instead be performed as described previously.

If the computation is successful and a displacement is found which would create an empty slot to store F* and packet handling metadata for fingerprint F (YES at 265) then at 266 the fingerprint hash table's entries are rearranged according to the computed displacement and F* and packet handling metadata for fingerprint F are stored.

A displacement could involve the rearrangement of multiple stored fingerprints and metadata. For example, F* and packet handling metadata for fingerprint F could be stored in a previously filled slot at one of index $A_1, A_2 \ldots A_k$. The fingerprint and metadata previously occupying the slot (F') could be moved to an empty slot at one of its indices $A_1', A_2' \ldots A_k'$ other than the index value corresponding to the previous slot. If there were no empty slots at indices $A_1', A_2' \ldots A_k'$ then F' could be stored in a previously filled slot at one of $A_1', A_2' \ldots A_k'$. The fingerprint and metadata previously occupying that slot (F") could be moved to an empty slot in one of its indices $A_1'', A_2'' \ldots A_k''$ other than an index value corresponding to the previous slot. If there were no empty slots at indices $A_1'', A_2'' \ldots A_k''$ then F'" could be stored in a previously filled slot at one of $A_1'', A_2'' \ldots A_k''$, and so on. The displacement calculation could be limited to a maximum number of attempted displacements.

A displacement could be computed using any of a variety of algorithms. An example displacement calculation method is the Cuckoo algorithm, a form of which is described above.

Method 250 could achieve a higher hash table load factor than method 100. A hash table's load factor is defined as the ratio of the hash table's filled slots to the total number of slots. A higher load factor could allow more efficient use of the memory storing the hash table. Method 250 could however have a less deterministic insertion time than methods 100, 150 owing to its iterative nature.

Other variations of method 250 are possible. For example, instead of a single hash table there could be multiple hash tables. Further variations could also or instead involve features that are described elsewhere herein.

Figure 2B:
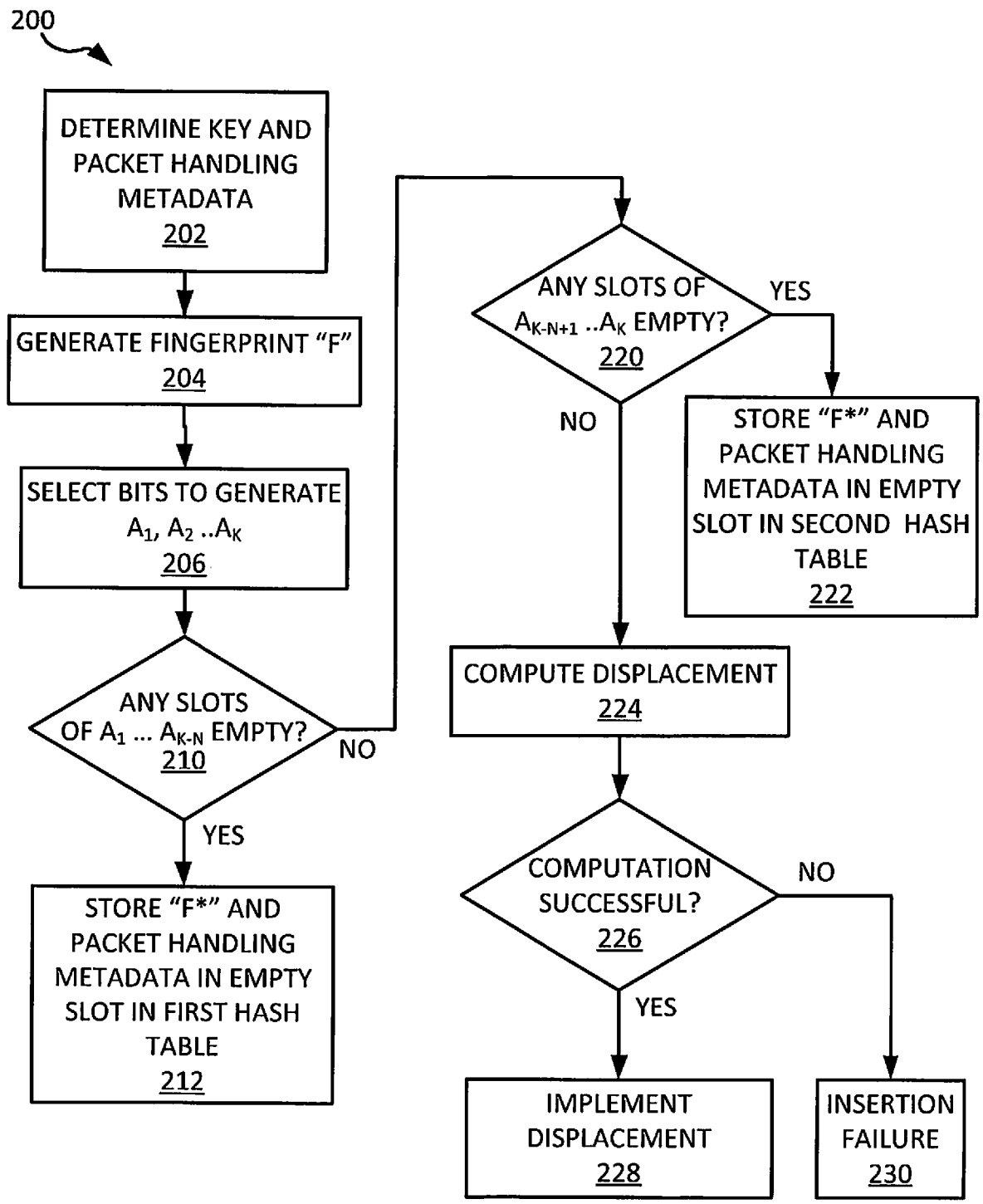
FIG. 2B is a flow diagram of another example method of filling two fingerprint hash tables.

FIG. 2B is a flow diagram of another example method 200 of filling two fingerprint hash tables.

At 202 a key descriptive of a data packet and packet handling metadata associated with handling of the data packet are determined. Examples of how the key and packet handling metadata could be generated are described elsewhere herein.

At 204 a "fingerprint" (F) of the key is generated using a fingerprint hash function, which could involve using any of the techniques described herein.

At 206 "k" different index values $A_1, A_2 \ldots A_k$ are created, illustratively by selecting bits of fingerprint F.

At 210 it is determined whether any of the buckets at $A_1 \ldots A_{k-N}$ in a first fingerprint hash table have an empty slot.

If there is a bucket at $A_1 \ldots A_{k-N}$ in the first fingerprint hash table with an empty slot (YES at 210), then at 212, in the empty slot of that bucket, the remaining bits $F^*$ of fingerprint "F" not selected as index bits of that bucket and the fingerprint's associated packet handling metadata are explicitly stored. The emptiness of a slot could be determined by any of the methods previously described.

If none of the buckets at $A_1 \ldots A_{k-N}$ in the first fingerprint hash table have empty slots (NO at 210) then at 220 it is determined whether any of the buckets at indices $A_{k-N+1} \ldots A_k$ in the second fingerprint hash table has an empty slot. If there is a bucket at $A_{k-N+1} \ldots A_k$ in the second fingerprint hash table with an empty slot (YES at 220) then at 222 in the empty slot of that bucket, the remaining bits $F^*$ of fingerprint "F" not selected as index bits of that bucket and the fingerprint's associated packet handling metadata are explicitly stored.

If none of the buckets at $A_{k-N+1} \ldots A_k$ have empty slots (NO at 220) then at 224 a displacement of the stored fingerprints and metadata in the first and/or the second hash table is computed which would create an empty slot to store $F^*$ and packet handling metadata for fingerprint F. If the computation is unsuccessful and no displacement can be found to create an empty slot to store $F^*$ and packet handling metadata for fingerprint F (NO at 226) then an insertion failure is recorded at 230, and other failure or error processing could also or instead be performed as described previously.

If the computation is successful and a displacement is found which would create an empty slot to store $F^*$ and packet handling metadata for fingerprint F (YES at 226), then at 228 the displacement is implemented, the first and or second fingerprint hash table's entries are rearranged according to the computed displacement and $F^*$ and packet handling metadata for fingerprint F are stored.

A displacement could involve the rearrangement of multiple stored fingerprints and metadata in the first hash table and/or the second hash table. A displacement could be computed using any of a variety of algorithms. An example displacement calculation method is the Cuckoo algorithm.

For example, $F^*$ and packet handling metadata for fingerprint F could be stored in a previously filled slot of a bucket at one of indices $A_1, A_2 \ldots A_k$. The fingerprint and metadata previously occupying the slot (F') could be moved to an empty slot at one of its remaining indices $A_1', A_2' \ldots A_k'$ other than the index value corresponding to the previous slot. If there were no empty slots at indices $A_1', A_2' \ldots A_k'$ then F' could be stored in a previously filled slot of a bucket at one of remaining indices $A_1', A_2' \ldots A_k'$. The fingerprint and metadata previously occupying that slot (F'') could be moved to an empty slot of a bucket at one of its remaining indices $A_1'', A_2'' \ldots A_k''$ other than the index value corresponding to the previous slot.

If there were no empty slots at indices $A_1'', A_2'' \ldots A_k''$ then F''' could be stored in a previously filled slot at one of $A_1'', A_2'' \ldots A_k''$, and so on. The displacement calculation could be limited to a maximum number of attempted displacements.

Variations of method 200 could involve features that are described elsewhere herein.

FIGS. 1C to 2B are all illustrative of methods for filling fingerprint hash tables. Each of these methods involves determining a key that is descriptive of a packet and packet handling metadata associated with handling of a data packet that is consistent with the determined key. This is shown at 102, 152, 252, 202 in FIGS. 1C to 2B. The key and the packet handling metadata need not necessarily be determined together, or even by the packet classifier or the same device or component. For example, the key could be determined by a packet sensor and the packet handling metadata could be determined by a firewall or security device. The key and the packet handling metadata could then be provided to or otherwise obtained by the packet classifier. In this example, the packet classifier could be considered to determine the packet handling metadata and key by obtaining it from another component, specifically the firewall, packet sensor or security device.

These methods also involve applying a fingerprint hash function to the determined key to generate a fixed length fingerprint of the determined key (104, 154, 254, 204), and determining an index value based on a portion of the fingerprint. The examples in FIGS. 1C to 2B include selecting bits of a fingerprint F to generate multiple index values, at 106, 156, 256, 206. Index values could be otherwise based on respective portions of a fingerprint.

Methods as disclosed herein also involve storing in a memory, at a memory location associated with an index value: a remainder of the fingerprint other than the portion of the fingerprint upon which the index value is based, and in some embodiments the determined packet handling metadata. This is shown at 112, 162/169, 262, 212/222 in FIGS. 1C to 2B. It should be noted, however, that storing the packet handling metadata need not necessarily involve explicitly storing the packet handling metadata. As described elsewhere herein, the packet handling metadata could be stored implicitly as the presence or absence of the key in a data structure. With either implicit or explicit storage of the packet handling metadata, storage of the remainder of the fingerprint at the memory location associated with the index value indicates that data packets consistent with the determined key are to be handled in accordance with the determined packet handling metadata.

Examples of a fingerprint hash function include a CRC hash function, and other hash functions could potentially be used to generate fingerprints.

Although the description above refers to determining an index value, multiple index values based on respective portions of a fingerprint could be determined, and one index value could be selected from those multiple index values. No single portion of a fingerprint includes the entire fingerprint.

Each index value is associated with a respective memory location. Selection of one index value could involve selecting as the index value one of the multiple index values for which the associated memory location is available to store the remainder of the fingerprint, and in some embodiments the determined packet handling metadata.

Index values could include multiple sets of index values associated with memory locations in respective memory tables, in which case selecting an index value could involve selecting as the index value one of the index values for which the associated memory location is available to store the remainder of the fingerprint, and in some embodiments the determined packet handling metadata. Each set could include one or more index values.

The index values could be of equal length or different lengths. For example, multiple sets of index values could include a first set of index values that have a first length and a second set of index values that have a second length different from the first length.

FIGS. 1D and 2B involve multiple memory tables. In such embodiments, selecting an index value to store the remainder of the fingerprint could involve searching memory locations, in a first memory table associated with index values in a first set of index values, for a memory location that is available to store the remainder of the fingerprint, and in some embodiments the determined packet handling metadata. Such searching is shown at 160 in FIG. 1D and 210 in FIG. 2B. One of the index values in the first set of index values for which the associated memory location is available to store the remainder of the fingerprint, and in some embodiments the determined packet handling metadata, could then be selected to store the remainder of the fingerprint, and possibly the packet handling metadata, as shown at 162 in FIG. 1D and 212 in FIG. 2B.

If no memory location associated with the index values in the first set of index values is available to store the remainder of the fingerprint, and in some embodiments the determined packet handling metadata, then memory locations in a second memory table associated with index values in a second set of index values are searched for a memory location that is available to store the remainder of the fingerprint, and in some embodiments the determined packet handling metadata, as shown at 164 in FIG. 1D and 220 in FIG. 2B. One of the index values in the second set of index values for which the associated memory location is available to store the remainder of the fingerprint, and in some embodiments the determined packet handling metadata, could then be selected to store the remainder of the fingerprint, and possibly the packet handling metadata, as shown at 169 in FIG. 1D and 222 in FIG. 2B.

Memory tables could be stored in any of various types of memory devices. For example, a first memory table could be stored in an on-chip memory of a processor integrated circuit that is used to implement a packet processor, and a second memory table could be stored in an off-chip memory.

The memory location associated with an index value need not necessarily be empty in order for that memory location to be available for storing the remainder of the fingerprint, and possibly the determined packet handling metadata. In some embodiments, before the storing, a determination is made as to whether the memory location associated with the index value is occupied, and where the memory location associated with the index value is occupied, a displacement of one or more entries in the memory to make the memory location available for storage is computed. A method could involve implementing the computed displacement of the one or more entries, if the computation is successful. Displacement-based operations are shown by way of example at 264/265/266 in FIG. 2A and 224/226/228 in FIG. 2B.

Figure 3A:
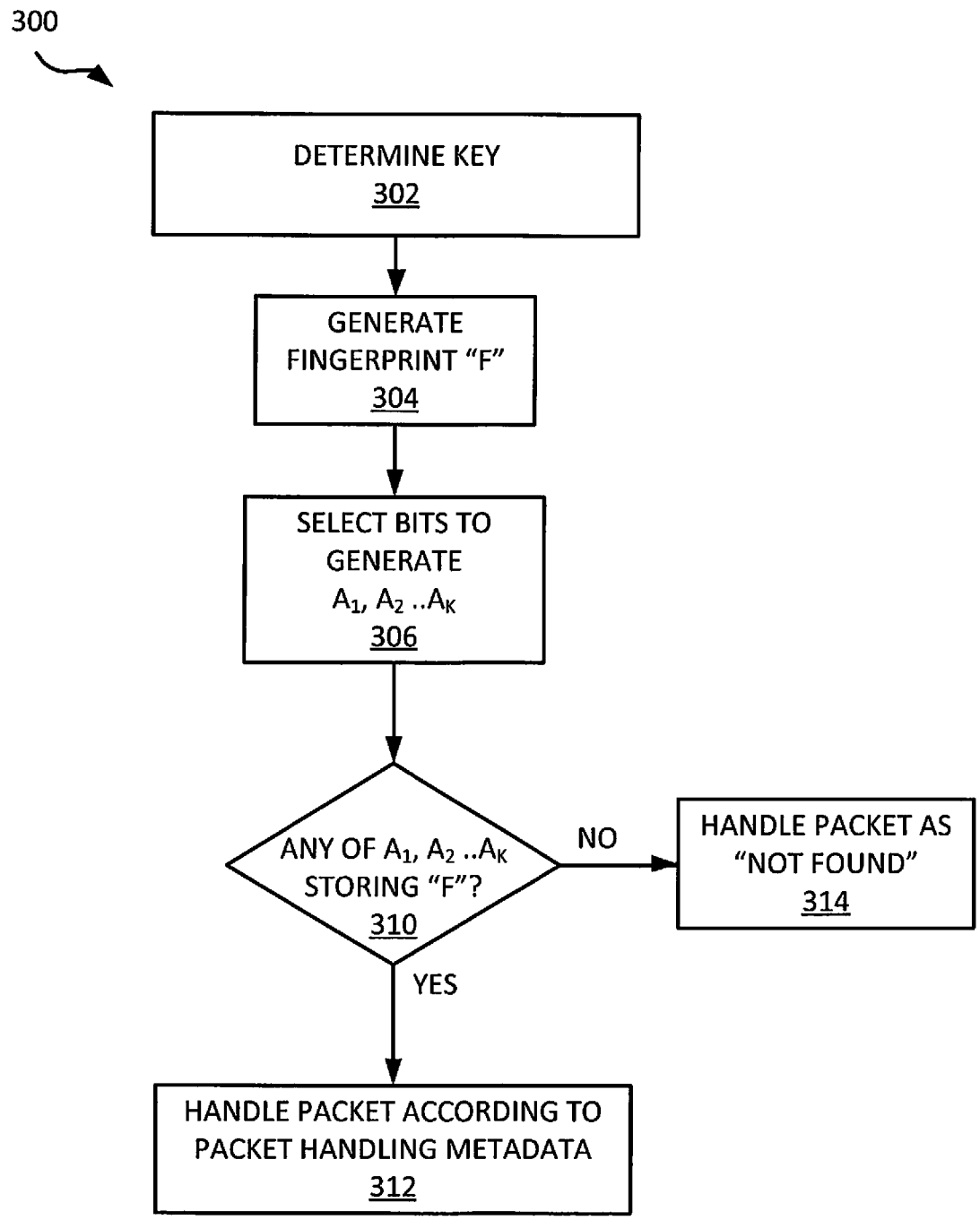
FIG. 3A is a flow diagram of an example packet classification method using a fingerprint hash table.

FIG. 3A is a flow diagram of an example packet classification method 300 using a fingerprint hash table. The fingerprint hash table could be created by method 100, 150, 250, or 200. At 302 the packet is received and its key is determined. At 304 a fingerprint "F" is generated from the key. Examples of how a key could be determined and how a fingerprint could be generated are described elsewhere herein.

At 306 "k" different index values $A_1, A_2 \ldots A_k$, all of equal length in an embodiment, are created based on portions of the fingerprint F, illustratively by selecting bits of fingerprint F in the example shown in FIG. 3A.

At 310 it is determined whether any of the slots of the buckets at $A_1, A_2 \ldots A_k$ store fingerprint "F". The contents of the buckets at $A_1, A_2 \ldots A_k$ could be read sequentially or in parallel. If any of the buckets at $A_1, A_2 \ldots A_k$ store fingerprint "F" (YES at 310) then at 312 the packet is handled according to the packet handling metadata that is stored, implicitly or explicitly, in that bucket for fingerprint "F".

A bucket could be considered to store or contain fingerprint F if the bucket contents, together with its index, correspond to fingerprint F. The bucket itself need not explicitly store the entire fingerprint. As disclosed herein, a fingerprint hash table is indexed by index values that are based on a portion of a fingerprint. That portion of the fingerprint is thereby implicitly stored, and the remainder of a fingerprint is explicitly stored in the contents of a bucket.

If none of the buckets at $A_1, A_2 \ldots A_k$ contain fingerprint "F" (NO at 310) then at 314 the packet is handled as "NOT FOUND". This could involve forwarding the packet to a next stage of processing, dropping the packet or expediting delivery of the packet, for example.

Figure 3B:
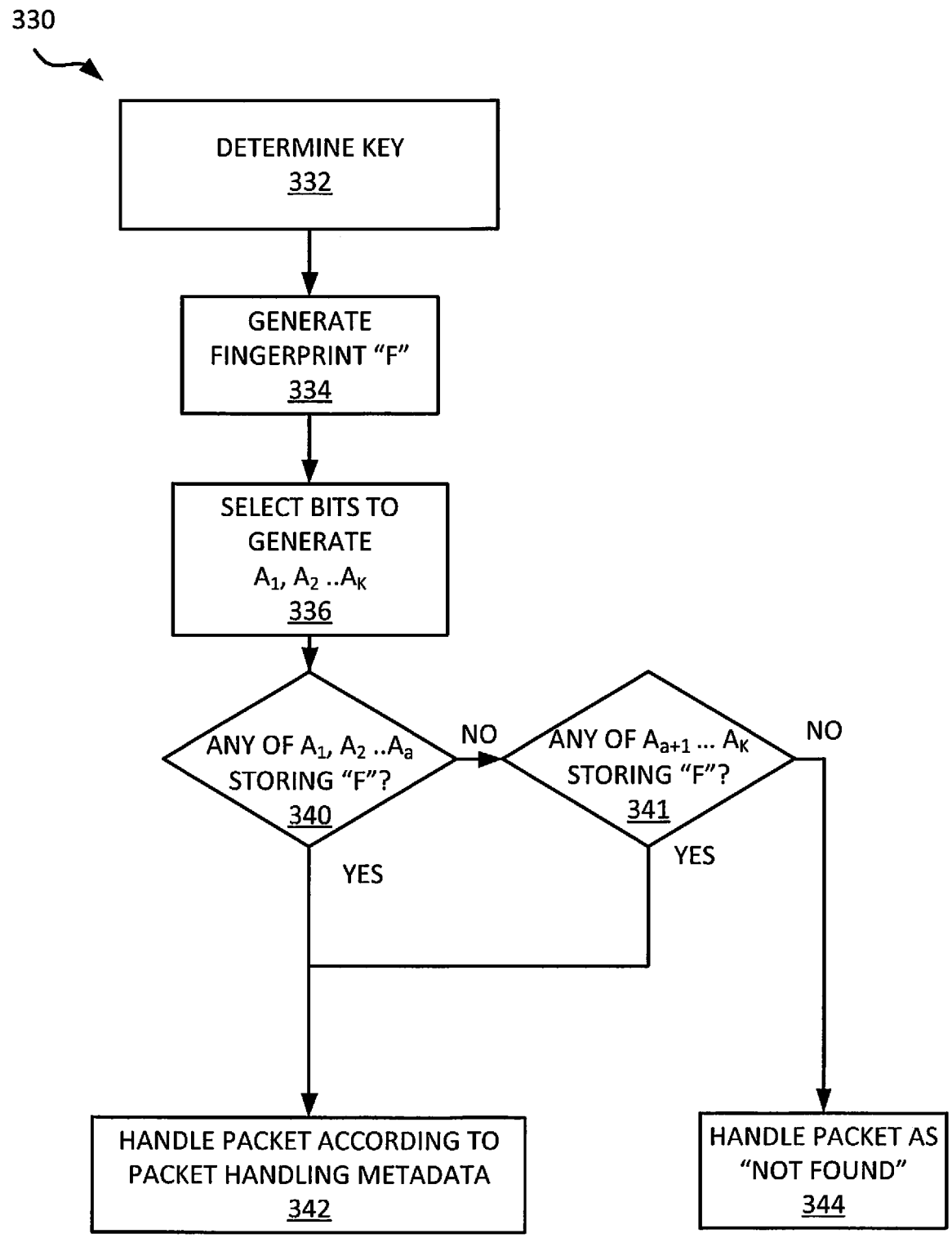
FIG. 3B is a flow diagram of an example packet classification method using first and second fingerprint hash tables.

FIG. 3B is a flow diagram of an example packet classification method 330 using first and second fingerprint hash tables. FIGS. 1D and 2B illustrate examples of methods of filling multiple hash tables.

At 332 the packet is received and its key is determined. At 334 a fingerprint "F" is generated from the key. Examples of how a key could be determined and how a fingerprint could be generated are described elsewhere herein.

At 336, "k" different index values $A_1, A_2 \ldots A_k$ are created, illustratively by selecting bits of fingerprint F. In an embodiment, the bit lengths of index values $A_{a+1} \ldots A_k$ are equal and the bit lengths of index values $A_1 \ldots A_a$ are also equal.

At 340 it is determined whether any of the slots of the buckets at $A_1 \ldots A_a$ in the first fingerprint hash are storing fingerprint "F". If one of the buckets at $A_1 \ldots A_a$ in the first fingerprint hash table are storing fingerprint "F" (YES at 340) then at 342 the packet is handled according to the packet handling metadata stored in that bucket for fingerprint "F".

If none of the slots of the buckets at $A_1 \ldots A_a$ of the first fingerprint hash table are storing fingerprint "F" (NO at 340) then at 341 it is determined whether any of the slots of the buckets at $A_{a+1} \ldots A_k$ in the second fingerprint hash table are storing fingerprint "F".

If one of the buckets at $A_{a+1} \ldots A_k$ in the second fingerprint hash table are storing fingerprint "F" (YES at 341) then at 342 the packet is handled according to the packet handling metadata stored in that bucket for fingerprint "F".

If none of the buckets at $A_{a+1} \ldots A_k$ in the second fingerprint hash table are storing "F" (NO at 341) then the packet is handled as "NOT FOUND" at 344. This could involve forwarding the packet to a next stage of processing, dropping the packet or expediting delivery of the packet, for example.

A fingerprint hash table could be stored in a semiconductor memory. In one embodiment, a fingerprint hash table is stored in a Dynamic Random Access Memory (DRAM). The number of bits read from or written to a DRAM in parallel is referred to as its width "N". A DRAM could be controlled to output or "burst" the contents of multiple consecutive memory locations on a single memory access and is said to have a "burst length" of "BL". The burst length is often a power of two and is often programmable. For example, a DRAM could have a burst length of 4, 8, 16, 32 or 64.

A fingerprint hash table could be stored in a DRAM and the DRAM could be read using a burst length "BL" according to the following relationship $$BL \geq S*(F*+A)/N$$

where "S" is equal to the number of slots in the fingerprint hash table's buckets, F* is equal to the number of bits of the explicitly stored fingerprint and "A" is the number of bits of the associated packet handling metadata.

Using this relationship, at least the entire contents of a fingerprint hash table's bucket could be read on a single memory access.

A fingerprint hash table could be stored across multiple DRAM devices which could all be read in parallel. For example, a Dual In-line Memory Module (DIMM) is a common type of memory module used in many computing and telecommunications applications. A DIMM includes a PCB (Printed Circuit Board) upon which are mounted multiple DRAM devices in parallel, and could include additional memory intended for error correction. The number of bits read from or written to a DIMM in parallel (not including any error correction bits) is referred to as the DIMM's width "N_DIMM".

A fingerprint hash table could be stored in a DIMM and the DIMM could be read using a burst length "BL" according to the following relationship $$BL \geq S*(F*+A)/N\_DIMM$$

where "S" is equal to the number of slots in the fingerprint hash table's buckets, F* is equal to the number of bits of the explicitly stored fingerprint and "A" is the number of bits of the associated packet handling metadata.

Using this relationship, at least the entire contents of a fingerprint hash table's bucket could be read on a single memory access.

Multiple copies of the fingerprint hash table could be stored in a DIMM and accessed sequentially to improve access time. For example, a DIMM could comprise eight, 4 Gb DRAMs. Each DRAM could be eight bits wide and internally organized into eight identical and independent memory banks, with each memory bank comprising 512 Mb of storage. Each DRAM could store a different portion of the fingerprint hash table and each portion could be replicated across its eight banks. A single read operation with a burst length of eight could retrieve eight, 64b words from the DIMM, which could be the contents of an entire bucket. Successive read operations could be distributed over the remaining seven banks of each DRAM to reduce the read latency of the DIMM.

Alternatively, a DIMM could store two fingerprint hash tables of equal size. For example, a DIMM could comprise eight, 4 Gb DRAMs. Each DRAM could be eight bits wide and internally organized into eight identical and independent memory banks, with each memory bank comprising 512 Mb of storage. Each DRAM could store a different portion of the two fingerprint hash tables and each portion of the first fingerprint hash table could be replicated across four of its eight banks and each portion of the second fingerprint hash table could be replicated across the remaining four of its eight banks. A first read operation with a burst length of eight could retrieve eight, 64b words from the first fingerprint hash table and a second read operation could retrieve eight, 64b words from the second fingerprint hash table. The first read operation could retrieve the entire contents of a first bucket of the first fingerprint hash table and the second read operation could retrieve the entire contents of a bucket of the second hash table. Successive read operations of the first and second fingerprint hash tables could be distributed over the remaining six banks of each DRAM to reduce the read latency of the DIMM.

Storing four copies of two fingerprint hash tables in the DIMM could advantageously increase key handling capacity relative to storing eight copies of one fingerprint hash table, even if the one fingerprint hash table had two bucket indices and the two hash tables had one bucket index apiece.

For example, a 4 GB DIMM storing eight copies of a fingerprint hash table where the fingerprint portion and associated metadata totals to 64b has a maximum capacity of 64M entries. The same 4 GB DIMM storing four copies of two fingerprint hash tables where the fingerprint portion and associated metadata totals to 64b has a maximum capacity of 128M entries. The bandwidth requirements of both configurations are identical since they both involve two indices and a maximum of two memory accesses.

FIG. 3A and FIG. 3B are illustrative of packet classification methods that use fingerprint hash tables. Each of these methods involves determining a key based on a data packet (302, 332), applying a fingerprint hash function to the determined key to generate a fingerprint of the determined key (304, 334), determining an index value based on a portion of the fingerprint (306, 336), and accessing a memory location associated with the index value (310, 340/341) to determine whether the memory location stores a remainder of the fingerprint other than the portion of the fingerprint. Such methods also involve handling the data packet according to packet handling metadata associated with the fingerprint, where the memory location contains the remainder of the fingerprint. The packet handling metadata could be explicitly stored in the memory location, or implicitly stored. Packet handling is shown at 312 and 342 in FIGS. 3A and 3B.

The memory location could be a memory location in one of multiple memory tables. For example, applying a fingerprint hash function and determining an index value could be performed by a packet processor integrated circuit. In such an embodiment, the memory tables could include a first memory table stored in an on-chip memory of the packet processor integrated circuit and a second memory table stored in an off-chip memory that is coupled to the packet processor integrated circuit. In another embodiment, the first memory table could instead be stored in a CAM and the second memory table could be stored in another memory such as a DRAM, for example.

The memory location could be a memory location in a DRAM, for example and wherein the accessing involves reading from the DRAM using a burst length BL according to the following relationship:

$$BL \geq S*(F*+A)/N$$

as described above.

In another embodiment, the memory location is a memory location in a DIMM that includes multiple DRAM devices in parallel, and the accessing involves reading from the DIMM using a burst length BL according to the following relationship:

$$BL \geq S*(F*+A)/N\_DIMM$$

as described above.

Determining an index value could involve determining multiple index values based on respective portions of a fingerprint. The index values are associated with respective memory locations in a table. The accessing could then involve accessing the memory locations associated with different index values by distributing the memory accesses over multiple copies of the table.

In another embodiment, determining an index value involves determining a first index value for a first data packet and a second index value for a second data packet. The first and second index values are associated with first and second memory locations, respectively, in a table. The accessing could then involve accessing the first and second memory locations associated with the first and second index values by distributing memory accesses over first and second copies of the table.

Index values could include multiple sets of index values associated with memory locations in respective memory tables. In such embodiments, the accessing could involve accessing one of the memory locations associated with index values in different sets of index values. Accessing one of the memory tables associated with index values in different sets of index values could involve accessing different copies of the memory tables.

Embodiments are described above primarily in the context of example methods. Other embodiments, including apparatus embodiments, are also contemplated.

Figure 4:
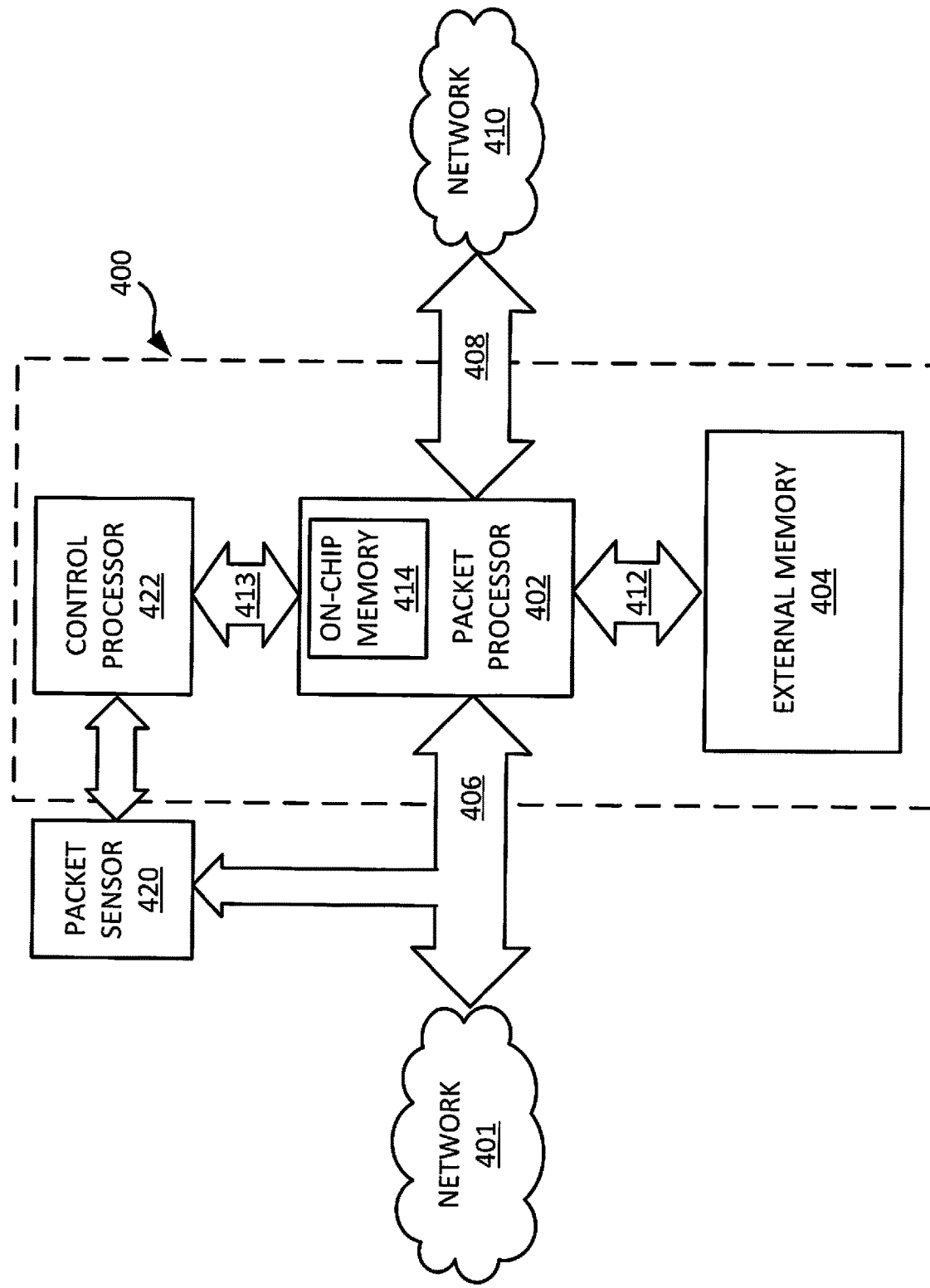
FIG. 4 is a block diagram of an example packet classifier.

FIG. 4 is a block diagram of an example packet classifier. Packet classifier 400 comprises control processor 422, packet processor 402, external memory 404, first data port 406, second data port 408, first memory bus 412 and memory/control bus 413. Memory/control bus 413 could be a PCI Express (Peripheral Component Interconnect Express) bus, in one embodiment. The same bus or a different bus could also couple the control processor 422 to the external memory 404.

Packet processor 402 comprises on-chip memory 414. Packet processor 402 connects to external memory 404 over first memory bus 412 and connects to control processor 422 over memory/control bus 413. Single or multiple fingerprint hash tables could be stored in external memory 404. Single or multiple fingerprint hash tables could optionally be stored in on-chip memory 414.

Packet processor 402 could be an FPGA, a microprocessor or an Application Specific Integrated Circuit (ASIC), for example. Control processor 422 could be an FPGA, a microprocessor or an Application Specific Integrated Circuit (ASIC), for example. In one embodiment packet processor 402 is an FPGA and control processor 422 is a microprocessor. External memory 404 could be DRAM, SRAM or flash memory.

Packet classifier 400 connects to a first network 401 through first data port 406 and to a second network 410 through second data port 408. Either or both of networks 401 and 410 could be local area networks such as with a residence, business, university campus, or wide area networks such as portions of the internet, for example. Packet sensor 420 monitors data traffic on first data port 406 and provides control signals to control processor 422. Control signals could comprise key values corresponding to packets to be classified by packet classifier 400 and packet handling metadata associated with the handling of the packets.

Packet sensor 420 could be a firewall, a dedicated security device, a server or a network administrator terminal, for example.

FIG. 4 is illustrative only, and other implementations are possible. For example, there could be more than two networks connected to packet classifier 400, and/or packet processor 402 might not comprise any on-chip memory. Two networks might connect to the packet classifier 400 over the same physical data port, for example when a tunneling protocol such as Multi Protocol Label Switching (MPLS) is used. Control processor 422 and packet processor 402 might be a single, unified processor. Control processor 422 might directly monitor data port 406. In other embodiments, multiple data ports 406, 408 are monitored by a packet sensor, a control processor, and/or another component.

FIG. 4 is illustrative of an apparatus that includes a memory, such as on-chip memory 414 and/or external memory 404, and a processor, shown by way of example as control processor 422, coupled to the memory. According to embodiments disclosed herein, such a processor could be configured to: determine, a key that is descriptive of a data packet and packet handling metadata associated with handling of a data packet that is consistent with the determined key. As described above in the context of method embodiments, determining the key and the packet handling metadata could involve a processor obtaining the key and packet handling metadata from another component such as packet sensor 420.

The processor is further configured in some embodiments to apply a fingerprint hash function to the determined key to generate a fixed length fingerprint of the determined key; to determine an index value based on a portion of the fingerprint; and to store in the memory, at a memory location associated with the index value: a remainder of the fingerprint other than the portion of the fingerprint to indicate that data packets consistent with the determined key are to be handled in accordance with the determined packet handling metadata. In some embodiments, the processor is also configured to store the determined packet handling metadata at the memory location associated with the index value.

The processor could be configured to determine the index value by determining multiple index values based on respective portions of the fingerprint and selecting the index value from the plurality of index values. In such embodiments, the multiple index values could include multiple sets of index values associated with memory locations in respective memory tables, and the selecting could involve selecting as the index value one of the index values for which the associated memory location is available to store the remainder of the fingerprint, and in some embodiments the determined packet handling metadata.

The memory tables could include, for example, a first memory table stored in an on-chip memory such as 414 and a second memory table stored in an off-chip memory such as 404.

FIG. 4 also includes a packet processor 402. A processor such as the packet processor 402 could be configured for packet classification. For example, a processor could be configured to determine a key based on a data packet; apply a fingerprint hash function to the determined key to generate a fingerprint of the determined key; determine an index value based on a portion of the fingerprint; access in a memory such as 404 and/or 414 a memory location associated with the index value to determine whether the memory location stores a remainder of the fingerprint other than the portion of the fingerprint; and handle the data packet according to packet handling metadata associated with the fingerprint, where the memory location stores the remainder of the fingerprint. The memory location could also store the packet handling metadata in some embodiments.

The memory could be or include a DRAM. A processor such as the control processor 422 and/or the packet processor 402 could be configured to access the memory by reading from the DRAM using a burst length BL according to the following relationship:

$$BL \geq S*(F*+A)/N$$

as disclosed herein.

In another embodiment, memory could be or include a DIMM, with the DIMM comprising multiple DRAM devices in parallel. In such embodiments, a processor could be configured to access the memory by reading from the DIMM using a burst length BL according to the following relationship:

$$BL \geq S*(F*+A)/N\_DIMM$$

as also disclosed herein.

A processor such as the control processor 422 and/or the packet processor 402 could be configured to determine an index value by determining multiple index values, based on respective portions of the fingerprint, with the index values being associated with respective memory locations in a memory table. Multiple copies of the memory table could be stored in the memory. In such embodiments, the processor could be configured to distribute memory accesses over the multiple copies of the memory table.

A processor such as the control processor 422 and/or the packet processor 402 could be configured to determine index values for different data packets, such as a first index for a first data packet and a second index for a second data packet, with the first and second index values being respectively associated with first and second memory locations in a memory table. In such embodiments, the processor could be configured to access the first and second memory locations associated with the first and second index values by distributing memory accesses over first and second copies of the memory table.

In another embodiment, a processor such as the control processor 422 and/or the packet processor 402 is configured to determine an index value by determining multiple index values based on respective portions of the fingerprint, and the index values include multiple sets of index values associated with memory locations in respective memory tables. The processor could be configured to access the memory by accessing one of the memory locations associated with index values in different sets of index values using different copies of the memory tables stored in the memory.

Other apparatus embodiments are also contemplated. For example, variations that are disclosed herein in the context of method embodiments could also or instead be implemented in apparatus embodiments, by configuring a processor to perform additional and/or different operations, in certain orders and/or in certain ways.

What has been described is merely illustrative of the application of principles of embodiments of the present disclosure. Other arrangements and methods can be implemented by those skilled in the art.

For example, the methods described above and shown in the drawings are illustrative of embodiments. Other embodiments could include additional, fewer, and/or different operations, performed in a similar or different order.

Similarly, example apparatus or devices disclosed herein are also representative of embodiments, and other embodiments could include additional, fewer, and/or different components coupled together in a similar or different order.

Although described primarily in the context of methods and apparatus, other embodiments could be implemented in the form of a non-transitory processor-readable medium storing instructions which, when executed by one or more processors, cause the one or more processors to perform a method as described herein.

For example, in one embodiment a non-transitory processor-readable medium stores instructions which, when executed by one or more processors, cause the one or more processors to perform a method that includes: determining a key that is descriptive of a data packet and packet handling metadata associated with handling of a data packet that is consistent with the determined key; applying a fingerprint hash function to the determined key to generate a fixed length fingerprint of the determined key; determining an index value based on a portion of the fingerprint; storing in a memory, at a memory location associated with the index value: a remainder of the fingerprint other than the portion of the fingerprint, to indicate that data packets consistent with the determined key are to be handled in accordance with the determined packet handling metadata.

In another embodiment, a non-transitory processor-readable medium stores instructions which, when executed by one or more processors, cause the one or more processors to perform a method that includes: determining a key; applying a fingerprint hash function to the determined key to generate a fingerprint of the determined key; determining an index value based on a portion of the fingerprint; accessing a memory location associated with the index value to determine whether the memory location stores a remainder of the fingerprint other than the portion of the fingerprint; handling the data packet according to packet handling metadata associated with the fingerprint, where the memory location stores the remainder of the fingerprint.

Another embodiment relates to non-transitory processor-readable medium storing a data structure. Such a data structure could include memory locations associated with respective index values, with each index value being based on a portion of a fingerprint generated by applying a fingerprint hash function to a key that is descriptive of a data packet. At each memory location, a remainder of the fingerprint, other than the portion of the fingerprint upon which the index value associated with the memory location is based, is stored. In some embodiments, packet handling metadata, associated with handling of a data packet that is consistent with the determined key, is also stored at each memory location.

What is claimed is:

1. A method comprising:
   determining a key based on a data packet;
   applying a fingerprint hash function to the determined key to generate a fingerprint of the determined key, the fingerprint comprising a number of bits;
   determining an index value based on a portion of the bits of the fingerprint;
   accessing a memory location associated with the index value to determine whether the memory location stores remaining bits of the fingerprint other than the portion of the bits of the fingerprint;
   handling the data packet according to packet handling metadata associated with the fingerprint, where the memory location stores the remaining bits of the fingerprint, wherein the packet handling metadata is determined by a network security device, wherein the packet handling metadata indicates packet handling for a set classification of the data packet that is derived from the determined key, wherein the set classification is among a plurality of set classifications, wherein the memory location comprises a memory location in a Dynamic Random Access Memory (DRAM), and wherein the accessing comprises reading from the DRAM using a burst length BL according to the following relationship:

$$BL \geq S*(F*+A)/N$$

where
S is a number of slots in the memory location,
F* is a number of the remaining bits of the fingerprint,
A is a number of bits of the packet handling metadata,
N is a width of the DRAM.

2. The method as recited in claim 1,
wherein the determining an index value comprises determining a plurality of index values including the index value, based on respective portions of the bits of the fingerprint, the index values being associated with respective memory locations in a table,
wherein the accessing comprises accessing the memory locations associated with different index values by distributing memory accesses over multiple copies of the table.

3. The method of claim 2, wherein the respective portions of the bits of the fingerprint are created from overlapping portions of the fingerprint.

4. The method as recited in claim 1,
wherein the determining an index value comprises determining a first index value for a first data packet and a second index value for a second data packet, the first and second index values being respectively associated with first and second memory locations in a table,
wherein the accessing comprises accessing the first and second memory locations associated with the first and second index values by distributing memory accesses over first and second copies of the table.

5. The method as recited in claim 1,
wherein the determining an index value comprises determining a plurality of index values including the index value, based on respective portions of the bits of the fingerprint, the plurality of index values comprising multiple sets of index values associated with memory locations in respective memory tables,
wherein the accessing comprises accessing one of the memory locations associated with index values in different sets of index values.

6. The method as recited in claim 5 wherein the accessing one of the memory locations associated with index values in different sets of index values comprises accessing different copies of the memory tables.

7. The method of claim 6, wherein at least one set of the sets of index values comprises a plurality of index values.

8. The method of claim 1, wherein the plurality of set classifications include classification into sets of packet of different reputation levels, wherein reputation indicates likelihood that the packet is from a legitimate source rather than a malicious source.

9. A method comprising:
determining a key based on a data packet;
applying a fingerprint hash function to the determined key to generate a fingerprint of the determined key, the fingerprint comprising a number of bits;
determining an index value based on a portion of the bits of the fingerprint;
accessing a memory location associated with the index value to determine whether the memory location stores remaining bits of the fingerprint other than the portion of the bits of the fingerprint;
handling the data packet according to packet handling metadata associated with the fingerprint, where the memory location stores the remaining bits of the fingerprint,
wherein the packet handling metadata is determined by a network security device,
wherein the packet handling metadata indicates packet handling for a set classification of the data packet that is derived from the determined key,
wherein the set classification is among a plurality of set classifications,
wherein the memory location comprises a memory location in a Dual In-line Memory Module (DIMM), the DIMM comprising multiple Dynamic Random Access Memory (DRAM) devices in parallel, and wherein the accessing comprises reading from the DIMM using a burst length BL according to the following relationship:

$$BL \geq S*(F*+A)/N\_DIMM$$

where
S is a number of slots in the memory location,
F* is a number of the remaining bits of the fingerprint,
A is a number of bits of the packet handling metadata,
N_DIMM is a width of the DIMM.

10. An apparatus comprising:
a memory; and
a processor, coupled to the memory, to: determine a key based on a data packet; apply a fingerprint hash function to the determined key to generate a fingerprint of the determined key, the fingerprint comprising a number of bits; determine an index value based on a portion of the bits of the fingerprint; access in the memory a memory location associated with the index value to determine whether the memory location stores remaining bits of the fingerprint other than the portion of the bits of the fingerprint; handle the data packet according to packet handling metadata associated with the fingerprint, where the memory location stores the remaining bits of the fingerprint,
wherein the packet handling metadata is determined by a network security device,
wherein the packet handling metadata indicates packet handling for a set classification of the data packet that is derived from the determined key,
wherein the set classification is among a plurality of set classifications,
wherein the memory comprises a Dynamic Random Access Memory (DRAM), and wherein the processor is configured to access the memory by reading from the DRAM using a burst length BL according to the following relationship:

$$BL \geq S*(F*+A)/N$$

where
S is a number of slots in the memory location,
F* is a number of the remaining bits of the fingerprint, A is a number of bits of the packet handling metadata,
N is a width of the DRAM.

11. The apparatus as recited in claim 10,
wherein the processor is configured to determine an index value by determining a plurality of index values including the index value, based on respective portions of the bits of the fingerprint, the index values being associated with respective memory locations in a memory table,
wherein multiple copies of the memory table are stored in the memory,
wherein the processor is configured to distribute memory accesses over the multiple copies of the memory table.

12. The apparatus as recited in claim 10,
wherein the processor is configured to determine an index value by determining a first index for a first data packet and a second index for a second data packet, the first and second index values being respectively associated with first and second memory locations in a memory table,
wherein the processor is configured to access the first and second memory locations associated with the first and second index values by distributing memory accesses over first and second copies of the memory table.

13. The apparatus as recited in claim 10,
wherein the processor is configured to determine an index value by determining a plurality of index values including the index value, based on respective portions of the bits of the fingerprint, the plurality of index values comprising multiple sets of index values associated with memory locations in respective memory tables,
wherein the processor is configured to access the memory by accessing one of the memory locations associated with index values in different sets of index values.

14. An apparatus comprising:
a memory; and
a processor, coupled to the memory, to: determine a key based on a data packet; apply a fingerprint hash function to the determined key to generate a fingerprint of the determined key, the fingerprint comprising a number of bits; determine an index value based on a portion of the bits of the fingerprint; access in the memory a memory location associated with the index value to determine whether the memory location stores remaining bits of the fingerprint other than the portion of the bits of the fingerprint; handle the data packet according to packet handling metadata associated with the fingerprint, where the memory location stores the remaining bits of the fingerprint,
wherein the packet handling metadata is determined by a network security device,
wherein the packet handling metadata indicates packet handling for a set classification of the data packet that is derived from the determined key,
wherein the set classification is among a plurality of set classifications,
wherein the memory comprises a Dual In-line Memory Module (DIMM), the DIMM comprising multiple Dynamic Random Access Memory (DRAM) devices in parallel, and wherein the processor is configured to access the memory by reading from the DIMM using a burst length BL according to the following relationship:

$$BL \geq S^*(F^*+A)/N\_DIMM$$

where
S is a number of slots in the memory location,
$F^*$ is a number of bits of the remaining bits fingerprint,
A is a number of bits of the packet handling metadata,
N_DIMM is a width of the DIMM.

* * * * *